United States Patent
Hudman et al.

(10) Patent No.: US 11,093,208 B2
(45) Date of Patent: Aug. 17, 2021

(54) USING DETECTED PUPIL LOCATION TO ALIGN OPTICAL COMPONENTS OF A HEAD-MOUNTED DISPLAY

(71) Applicant: Valve Corporation, Bellevue, WA (US)

(72) Inventors: Joshua Mark Hudman, Issaquah, WA (US); Jeremy Adam Selan, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/265,760

(22) Filed: Feb. 1, 2019

(65) Prior Publication Data

US 2019/0258442 A1    Aug. 22, 2019

Related U.S. Application Data

(60) Provisional application No. 62/710,374, filed on Feb. 16, 2018.

(51) Int. Cl.
*G02B 27/01* (2006.01)
*G06F 3/147* (2006.01)
(Continued)

(52) U.S. Cl.
CPC .............. *G06F 3/147* (2013.01); *G02B 7/005* (2013.01); *G02B 27/017* (2013.01);
(Continued)

(58) Field of Classification Search
CPC ... G06F 3/147; G02B 27/017; G02B 27/0176; G02B 27/0179; G02B 7/005;
(Continued)

(56) References Cited

U.S. PATENT DOCUMENTS 9,418,617 B1 *   8/2016   Starner .............. G02B 27/0093
10,043,281 B2 *  8/2018   Mallinson ............... G06F 3/015
(Continued)

FOREIGN PATENT DOCUMENTS

WO    2013/049248 A2    4/2013

OTHER PUBLICATIONS

International Search Report and Written Opinion dated Apr. 24, 2019, for International Application No. PCT/US2019/016393, 19 pages.

*Primary Examiner* — Rodney Amadiz
(74) *Attorney, Agent, or Firm* — Seed Intellectual Property Law Group LLP

(57) ABSTRACT

The disclosure relates generally to techniques for determining pupil location of a display device's user via imaging sensors on the display device, and using that information to verify and/or correct positioning of the display device or its internal components. The display device may be a head-mounted display ("HMD") device with display panels separated from a wearer's eyes via intervening lenses, with the sensors including optical flow sensor integrated circuits mounted on or near at least one of the display panels to capture images of the wearer's eye locations through the lenses, and with the correction to the positioning including modifications to the alignment or other positioning of the HMD device on the wearer user's head and/or its internal components within the HMD device (e.g., based on automated control of motors on the HMD device) to reflect a target alignment of the wearer's eyes relative to displayed information.

21 Claims, 8 Drawing Sheets

(51) Int. Cl.
  *G06T 7/73* (2017.01)
  *G02B 7/00* (2021.01)
  *G06K 9/00* (2006.01)
(52) U.S. Cl.
  CPC ..... *G02B 27/0176* (2013.01); *G02B 27/0179* (2013.01); *G06K 9/00604* (2013.01); *G06T 7/74* (2017.01); *G02B 2027/0138* (2013.01); *G02B 2027/0154* (2013.01); *G02B 2027/0181* (2013.01); *G02B 2027/0187* (2013.01); *G06T 2207/30201* (2013.01)
(58) Field of Classification Search
  CPC .... G02B 2027/0138; G02B 2027/0154; G02B 2027/0181; G02B 2027/0187; G06K 9/00604; G06T 7/74; G06T 2207/30201
  See application file for complete search history.

(56) References Cited

U.S. PATENT DOCUMENTS

| | | | |
|---|---|---|---|
| 10,650,533 B2* | 5/2020 | Mallinson | G06T 7/70 |
| 2014/0333665 A1 | 11/2014 | Sylvan et al. | |
| 2015/0097772 A1* | 4/2015 | Starner | G06F 3/013 |
| | | | 345/158 |
| 2015/0116199 A1 | 4/2015 | Yang et al. | |
| 2016/0292850 A1 | 10/2016 | Perez et al. | |
| 2017/0131765 A1 | 5/2017 | Perek et al. | |
| 2018/0046147 A1* | 2/2018 | Aghara | G02B 27/017 |
| 2018/0096503 A1* | 4/2018 | Kaehler | G02B 27/0172 |
| 2019/0000578 A1* | 1/2019 | Yu | A61B 34/10 |
| 2019/0235255 A1* | 8/2019 | Seibert | G06F 3/011 |

* cited by examiner

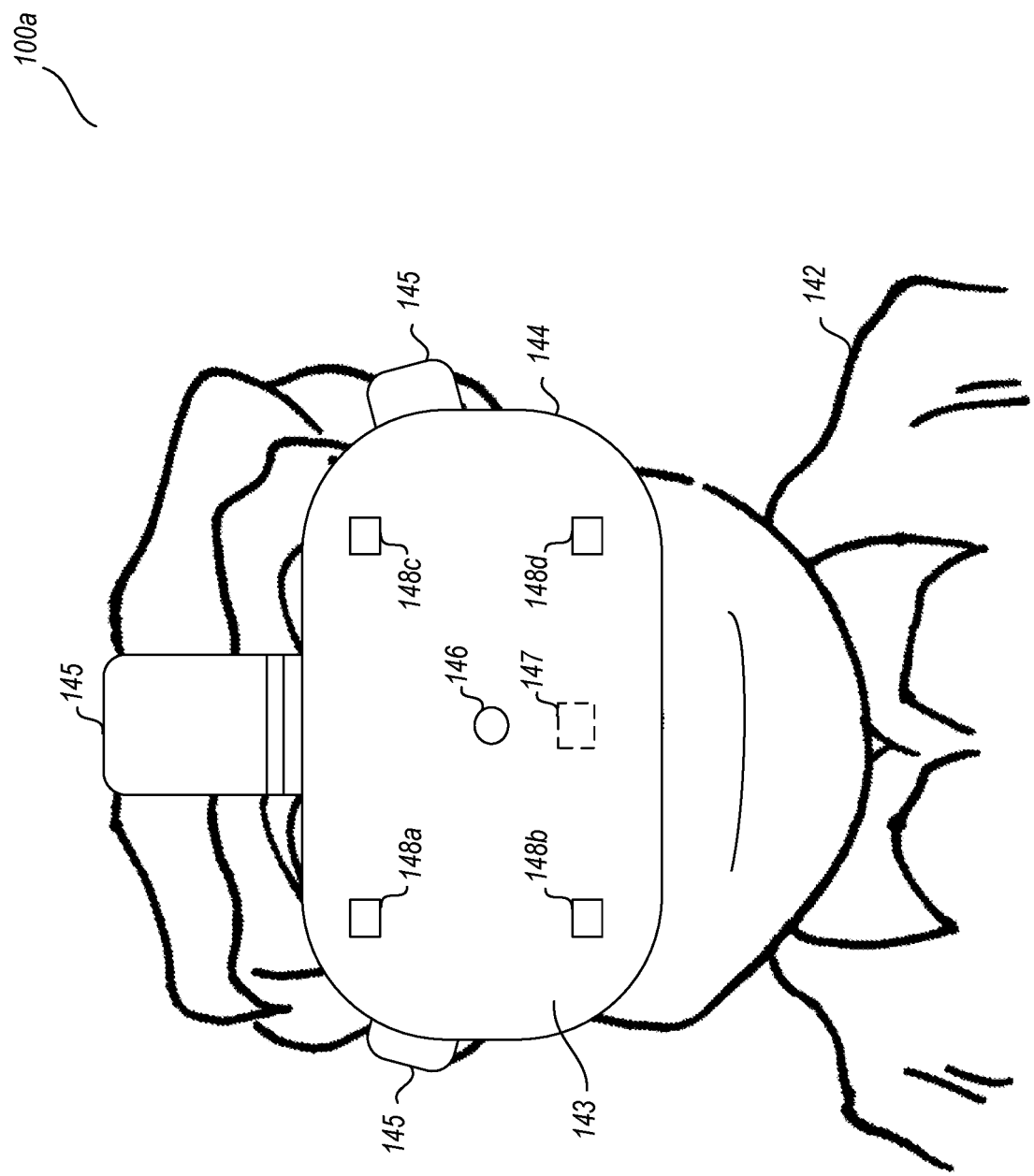

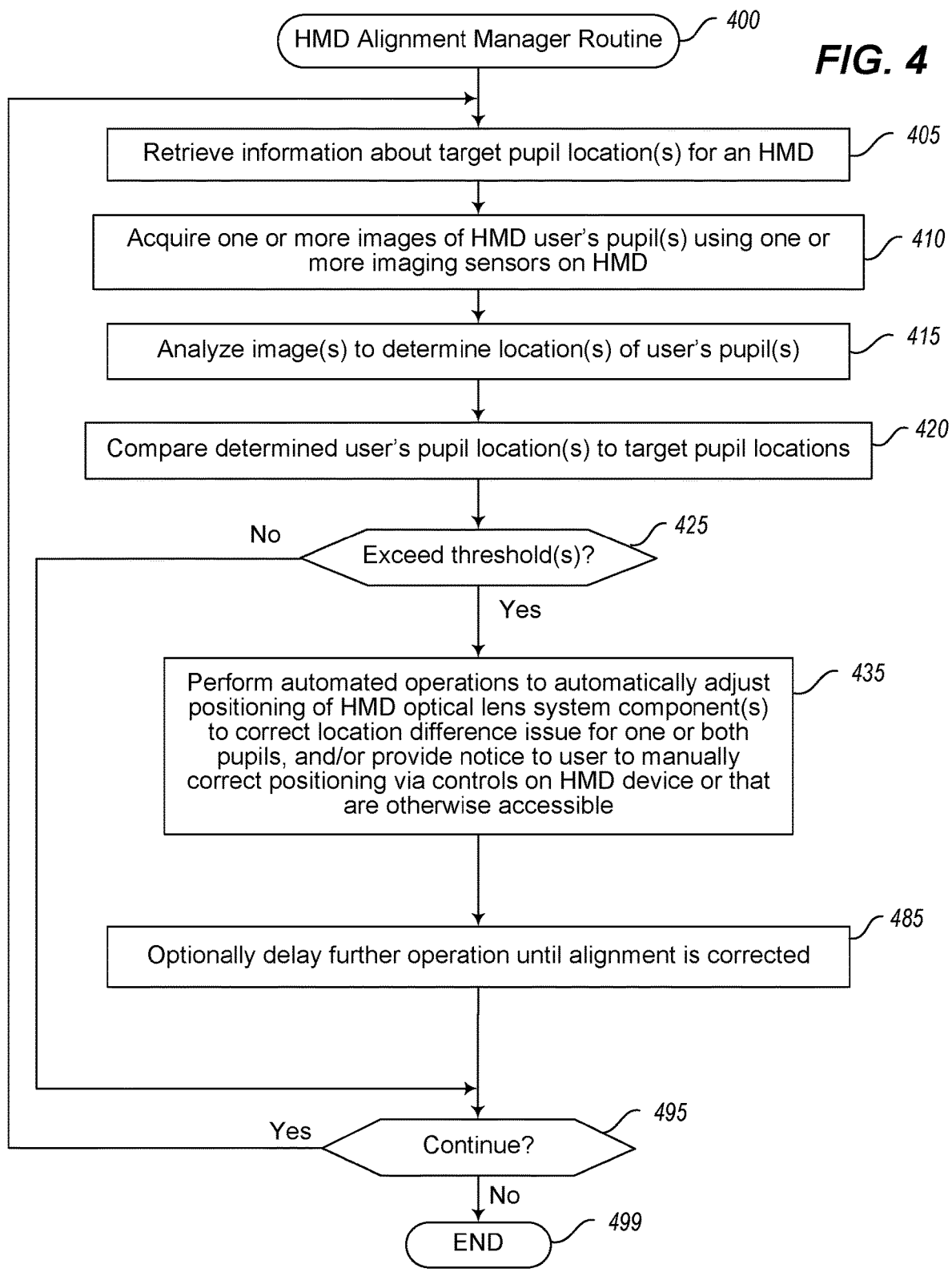

USING DETECTED PUPIL LOCATION TO ALIGN OPTICAL COMPONENTS OF A HEAD-MOUNTED DISPLAY

BACKGROUND

Technical Field

The following disclosure relates generally to techniques for using pupil location of a user to position a display panel or other image source for the user, such as for use with a head-mounted display device that includes imaging sensors on the device to capture images of a wearer user's eye(s).

Description of the Related Art

The growing popularity of virtual reality and augmented reality systems, particularly those using head-mounted display ("HMD") devices, has provided various benefits, including with respect to high-resolution imagery that is displayed to users wearing such systems and displays in ways that reflect the structures of the HMD devices and expected locations of the wearers' eyes. Virtual reality systems typically envelop a wearer's eyes completely and substitute a "virtual" reality for the actual view (of an actual physical reality) in front of the wearer, while augmented reality systems typically provide a semi-transparent or transparent overlay of one or more screens in front of a wearer's eyes such that an actual view is augmented with additional information, such as to potentially include associations between actual visible objects and displayed virtual information. In many virtual reality and augmented reality systems, the movement of a wearer of such an HMD device may be tracked in various manners, such as via sensors in the HMD device and/or external to it, in order to enable the images being shown to reflect user movements.

However, for such an HMD device to operate most efficiently, the positioning of the HMD device on the wearer's head is important, including to align the eyes of the wearer with the corresponding display from the HMD device.

BRIEF DESCRIPTION OF THE SEVERAL VIEWS OF THE DRAWINGS

FIG. 1A is a front pictorial diagram of an HMD device having binocular display subsystems and various sensors and integrated circuits, according to an example embodiment of the present disclosure.

FIG. 4 illustrates an example embodiment of an HMD Alignment Manager routine.

DETAILED DESCRIPTION

Figure 1B:
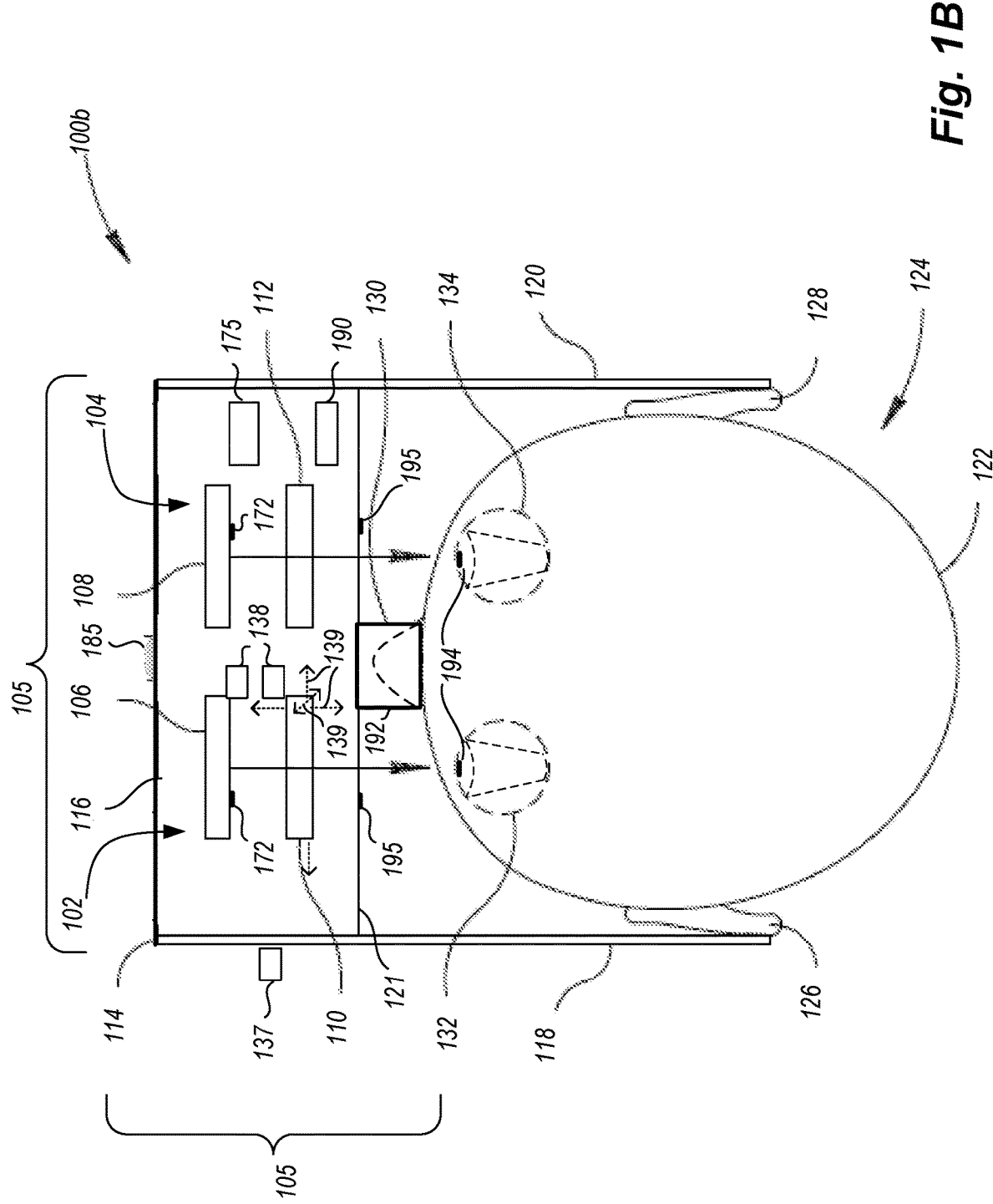
FIG. 1B illustrates a top plan view of an HMD device having binocular display subsystems and various sensors and integrated circuits, according to an example embodiment of the present disclosure.

The disclosure relates generally to techniques for determining pupil location of a user of a display device via imaging sensors on the display device, and using the determined pupil location to verify and/or correct positioning of one or more optical lens systems of the display device. In at least some embodiments, the display device is a head-mounted display ("HMD") device with one or more display panels separated from a wearer user's eye location(s) via one or more intervening lenses, and the imaging sensors include one or more optical flow sensor integrated circuits ("ICs") mounted on or near at least one of the display panels to capture images of the wearer user's eye location(s) through the lens(es), with the correction to the HMD device positioning including modifications to the alignment or other positioning of an optical lens system within the HMD device on the wearer user's head (e.g., based on automated or manual control of one or more motors in the HMD device) to reflect a target alignment of the wearer user's eyes relative to the display panel(s) and intervening lens(es). Additional details related to such techniques for determining user pupil location and for verifying and/or correcting positioning of optical lens system(s) of a display device are performed in at least some embodiments via automated operations of an HMD Alignment Manager system, such as a system that executes on the display device and/or on an associated computing system providing images to the display device (e.g., by one or more hardware processors, such as one or more GPUs, or graphical processing units, and/or one or more CPUs, or central processing units).

The use of the described techniques for determining a user's actual pupil location and for verifying and/or correcting positioning of optical lens system(s) of a display device may be performed at various times in various embodiments. For example, in some embodiments, the described techniques may be performed only once, such as at a time of startup of the HMD device or other display device, at a time of startup of a game program or other program that is supplying images to the HMD device or other display device, etc. In other embodiments, the described techniques may be performed in other manners, such as periodically, when initiated by a program that supplies images to the display device and/or that renders the images for the display device, when other specified criteria are satisfied (e.g., an amount or degree of movement by the display device exceeds a defined threshold, such as measured by an IMU (inertial measurement unit) on the display device and/or by one or more sensors external to the display device, including to address situations in which a display device that was previously positioned correctly is misaligned or otherwise incorrectly positioned after the movement), etc.

As noted above, the determining of the actual pupil location may include using imaging sensors on a display device to acquire images of one or both eyes of a user of the display device (e.g., by using one or more separate imaging sensors for each eye). The imaging sensors may be of various types in various embodiments, such as by using optical flow sensor ICs (e.g., similar to or identical to those used in optical mice), cameras (e.g., low resolution cameras), wafer-level optics or other types of microlenses, etc. Furthermore, the imaging sensors may be located in one or more locations on the display device—for example, for an HMD device that is worn by a wearer user (also referred to herein as a "wearer") and that includes two separate optical lens systems that are each used by one eye of the wearer to focus light emitted from one or more display panels, the imaging sensors may be mounted on or near at least one of the display panels (e.g., at one or more edges of the display panel(s)) to capture images of the wearer's eye(s) through the optical lens system(s), or instead may be mounted on or near an interior surface of the HMD device near the user's face to directly capture images of the wearer's eye(s) without the images passing through the lens(es). The use of the terms "lens" herein refers to any optical element that adjusts the path of light, including reflective, refractive and other techniques, and a path of light entering a user's eye may include various elements (e.g., display panel, lens, a half-mirrored reflective element between a user's eyes view of the world, etc.) in various orders and arrangements. The described techniques may further be used with other types of display devices (whether with or without lenses) in some embodiments, as discussed further below, and imaging sensors may similarly be located on or near a display panel of such other devices or on other structural components (e.g., a housing) of such other devices. Additional details are included below related to techniques for acquiring images of user pupils.

The determining of the actual location of a pupil from one or more acquired images may similarly be performed in various manners in various embodiments. For example, such an acquired image may be analyzed in at least some embodiments to identify pixels that are black or otherwise sufficiently dark in the image (e.g., with a brightness or intensity magnitude below one or more defined thresholds), and to analyze the identified pixels to determine one or more corresponding points (e.g., a centroid of the dark pixels, such as to approximate a center location of the pupil; an approximate boundary of the dark pixels, such as to perform a best fit of a circle or oval shape to the identified pixels; etc.). It will be noted that such an analysis may be performed very rapidly and using relatively low resolution images—for example, optical flow sensor ICs may capture imaging sensor data at a high frame rate (e.g., 1000 Hz, 2000 Hz, 6000 Hz, etc.) and relatively low resolution (e.g., 400 PPI, or pixels per inch; 800 PPI; 1600 PPI; etc., using image sizes of 16×16 pixels, 30×30 pixels, etc.), and optionally using a relatively narrow field of view (e.g., 15°, 30°, 45°, etc.), but may nonetheless provide sufficient data for such a determination of one or more actual pupil location points. Furthermore, the pupil location determination techniques are used in at least some embodiments to determine the pupil location in two dimensions (e.g., horizontally and vertically, but without depth, such as based on analysis of a single image), while in other embodiments the techniques may determine pupil location in three dimensions (e.g., by correlating multiple images from multiple locations, by using other depth sensing sensors, etc.) and/or may track changes in actual locations of one or more pupils over time. Moreover, each pupil location may be determined separately in at least some embodiments based on one or more images acquired for that pupil, such as to identify situations in one pupil is aligned or positioned differently than the other pupil relative to the target locations at which they should be located for correct viewing (e.g., to reflect a skewed positioning of the HMD device), and to correct the alignment of each eye independently or in a coordinated manner (e.g., to reflect physical layout of the optical lens and other elements and/or to reflect operation of the other elements).

After determining one or more points to represent the actual pupil location in an acquired image, the techniques may further include determining an amount of vertical and/or horizontal difference (e.g., a distance) from a target location of the pupil for the imaging sensor that acquired the image, and determining if the actual pupil location is incorrect based on that distance or other difference(s) exceeding one or more defined thresholds (e.g., a single overall distance threshold, different thresholds for vertical and horizontal differences, etc.)—in particular, and as discussed in greater detail with respect to FIGS. 2A-2D, different imaging sensor locations may have different target pupil locations, such as to reflect an amount of offset of the imaging sensor location from a center point of the displayed image and the effects (if any) of any intervening lenses. Furthermore, if multiple imaging sensors at multiple locations are independently acquiring images of the same eye/pupil, such an analysis of the acquired images may be performed for multiple such imaging sensors (e.g., all of them), such as to combine the results (e.g., via averaging, weighted averaging, etc.) from the analysis of the images from those multiple imaging sensors, so as to determine the actual pupil location with a higher degree of accuracy (and optionally to use more precise thresholds for the determination of an incorrect actual pupil location). If the actual pupil location is not determined to be incorrect (e.g., based on the distance or other difference(s) being sufficiently small to not exceed the threshold(s)), normal operation of the HMD device or other display device may continue, while otherwise one or more automated corrective actions may be taken, as discussed further below. Furthermore, if one or more images are acquired and analyzed for each eye/pupil of the user, the determination of incorrect actual pupil location may further use information for one or both eyes/pupils in various ways, such as to determine that an incorrect actual pupil location situation exists (so as to initiate corrective actions) if either pupil is determined to have an incorrect location, if both pupils are determined to have incorrect locations, by combining the distance or other difference(s) information for both pupils (e.g., averaging, accumulating, etc.) and determined if the combined result exceeds one or more defined thresholds, etc. In addition, in at least some embodiments, the determination of the actual location of a pupil and/or the comparison of actual pupil location to a target pupil location may include using information about the 'entrance pupil' of a user's eye, which corresponds to the optical image of the pupil as seen from outside the eye (which differs slightly from the actual pupil location and size, so as to appear slightly in front of the actual pupil, due to the magnification from the cornea over the iris), such as to compensate for the entrance pupil effect if the target pupil location does not also correspond to the entrance pupil, although in other embodiments the target pupil location is for the entrance pupil to allow for direct comparison with the actual pupil locations in the acquired images.

The identification of target pupil location(s) for an imaging sensor may also be performed in various manners, such as to be predetermined for a type of HMD device or other display device based on its structural configuration, to be determined for a particular HMD device or other display device based on testing before use (e.g., during the manufacturing process), to be determined for a particular HMD device or other display device in a user-specific manner based on testing during initial use (e.g., to use one or more tests, such as the visibility of predetermined displayed information, to confirm that the display device is properly positioned, and to then acquire and analyze one or more images of the user's eye(s)), etc. In other embodiments, the distance or other difference(s) between an actual pupil location in an acquired image and a target pupil location for that acquired image (e.g., based on the acquiring imaging sensor) may be performed in other manners, such as by doing an image comparison of the acquired image to one or more target images that show the target pupil location. Additional details are included below related to techniques for determining actual pupil location.

If the determined actual pupil location for a user of an HMD device or other display device is determined to be incorrect (e.g., to differ sufficiently from the target pupil location, such as for one or both pupils), various types of automated corrective actions may similarly be performed in various manners in various embodiments. For example, an HMD device or other display device may include one or more motors that the HMD Alignment Manager system may automatically control to reduce or eliminate the distance or other difference(s) between the actual and target locations of one or more pupils. In the case of an HMD device affixed to a head of a wearer, the motors may control, for example, one or more of the following: internal locations of one or more optical lens systems and/or display panels of the HMD device, such as to adjust the interpupillary distance along a horizontal plane between two optical lens systems of the HMD device, or to more generally adjust one or more optical lens systems within the HMD device along one or more dimensions of a three-dimensional space; one or more straps attached to a housing of the HMD device and encircling at least part of a head of the wearer; a nose piece structure that rests on a nose of the wearer; etc. More generally, the motors may allow the alignment or other positioning of optical lens system(s) of the HMD device or other display device to be changed, whether relative to a position of the user's eyes or independently of such user eye positioning, and by moving the position of such optical lens system(s) while the display device remains fixed (e.g., by adjusting a position of an optical lens system within a housing of the display device) and/or by moving the position of the display device and its optical lens system(s) together. In other embodiments, the automated corrective actions of the HMD Alignment Manager system may include providing information to a user to cause the user to take one or more actions, whether instead of or in addition to manipulating one or more motors. Such information provided to the user may include, for example, a notice of an alignment or other positioning problem and/or instructions for correcting such a problem (e.g., to adjust one or more controls of the display device to adjust the location of one or more internal components without changing the overall position of the display device, such as to control one or more motors within the display device via manual manipulation of one or more physical controls on an exterior of the display device and/or via manual manipulation of a separate user input device that sends corresponding signals/instructions to the display device and its motor(s); to move the display device and/or the user's eye locations in a particular manner, such as with one or more directions and/or distances; etc.). Furthermore, in some embodiments the corrective actions of the HMD Alignment Manager system may further include pausing or stopping some or all operations of the display device until the identified problem is corrected, such as if the alignment or other positioning problem is sufficiently large or otherwise satisfies one or more specified criteria. Additional details are included below related to techniques for performing automated corrective actions to address a determined incorrect pupil location.

Thus, in this manner, the actual pupil location(s) of a particular user of an HMD device or other display device may be identified and used to determine if the alignment or other positioning of one or more optical lens systems of the display device is incorrect, such as to differ from target location(s) that reflect the display device structure and/or operation by an amount that exceeds one or more defined thresholds. In addition, if the determined actual pupil location(s) for the user are determined to be incorrect, various types of automated corrective actions may be performed to remedy the problem, such as to reduce or eliminate differences in the actual and target pupil location(s).

The use of the described techniques may thus provide various benefits, including to improve the safety of operation of the HMD device or other display device, to improve the efficiency and accuracy of displayed information, etc., including by eliminating inaccuracies of displayed information or other problems resulting from misalignment or other incorrect positioning. Furthermore, in embodiments in which the imaging sensors are optical flow sensor ICs or other low resolution devices and have high image acquisition rates, the techniques may be used to improve the accuracy of the detection of incorrect pupil locations (e.g., during continuous or otherwise rapidly repeated monitoring of actual pupil location) and/or to reduce the cost of the manufacturing process.

For illustrative purposes, some embodiments are described below in which various specific details are included for illustrative purposes, and in some cases some embodiments are simplified for the sake of brevity so as to not illustrate well-known components. For example, in some embodiments discussed below, particular types of display devices are used in particular manners (e.g., as part of an HMD device for virtual reality and/or augmented reality), particular types of imaging sensors are used, particular types of analyses are made of acquired images to determine incorrect pupil locations, particular types of corrective actions are taken in particular manners, etc. However, it will be appreciated that the inventive techniques may be used in a wide variety of other situations, including with other types of display devices and/or other types of determination of a user's pupil location or other gaze direction, some of which are discussed below.

FIG. 1A shows information 100a illustrating a front view of an example HMD device 144 when worn on the head of a user 142. The HMD device 144 includes a front-facing structure 143 that supports a front-facing or forward camera 146 and a plurality of sensors 148a-148d (collectively 148) of one or more types—as one example, some or all of the sensors 148 may assist in determining the location and orientation of the device 144 in space, such as light sensors to detect and use light information emitted from one or more external devices (not shown, and referred to at times as "base stations"). As shown, the forward camera 146 and the sensors 148 are directed forward toward an actual scene or environment (not shown) in which the user 142 operates the HMD device 144—the actual physical environment may include, for example, one or more objects (e.g., walls, ceilings, furniture, stairs, cars, trees, tracking markers, or any other types of objects). The particular number of sensors 148 may be fewer or more than the number of sensors depicted. The HMD device 144 may further include one or more additional components that are not attached to the front-facing structure (e.g., are internal to the HMD device), such as an IMU (inertial measurement unit) 147 electronic device that measures and reports the HMD device's 144 specific force, angular rate, and/or the magnetic field surrounding the HMD device (e.g., using a combination of accelerometers and gyroscopes, and optionally, magnetometers). The HMD device may further include additional components that are not shown, including one or more display panels and optical lens systems that are oriented toward eyes (not shown) of the user and that optionally have one or more attached internal motors to change the alignment or other positioning of one or more of the optical lens systems and/or display panels within the HMD device, as discussed in greater detail with respect to FIG. 1B.

The illustrated example of the HMD device 144 is supported on the head of user 142 based at least in part on one or more straps 145 that are attached to the housing of the HMD device 144 and that extend wholly or partially around the user's head. While not illustrated here, the HMD device 144 may further have one or more external motors, such as attached to one or more of the straps 145, and the automated corrective actions of the HMD Alignment Manager system may include using such motors to adjust such straps in order to modify the alignment or other positioning of the HMD device on the head of the user, as discussed in greater detail elsewhere herein. It will be appreciated that HMD devices may include other support structures that are not illustrated here (e.g., a nose piece, chin strap, etc.), whether in addition to or instead of the illustrated straps, and that some embodiments may include motors attached one or more such other support structures to similarly adjust their shape and/or locations to modify the alignment or other positioning of the HMD device on the head of the user. Other display devices that are not affixed to the head of a user may similarly be attached to or part of one or structures that affect the positioning of the display device, and may include motors or other mechanical actuators in at least some embodiments to similarly modify their shape and/or locations to modify the alignment or other positioning of the display device relative to one or more pupils of one or more users of the display device.

FIG. 1B includes information 100b to illustrate a simplified top plan view of an HMD device 105 that includes a pair of near-to-eye display systems 102 and 104—the HMD device 105 may, for example, be the same HMD device 144 illustrated in FIG. 1A or a different HMD device, and the HMD device(s) of FIGS. 1A and 1B may further be used in the examples of FIGS. 2A-2D, as discussed further below. The near-to-eye display systems 102 and 104 of FIG. 1B include display panels 106 and 108, respectively (e.g., OLED micro-displays), and respective optical lens systems 110 and 112 that each have one or more optical lenses. The display systems 102 and 104 may be mounted to or otherwise positioned within housing (or frame) 114, which includes a front-facing portion 116 (e.g., the same or similar to the front-facing surface 143 of FIG. 1A), a left temple 118, right temple 120 and interior surface 121 that touches or is adjacent to a face of a wearer user 124 when the HMD device is worn by the user. The two display systems 102 and 104 may be secured to the housing 114 in an eye glasses arrangement which can be worn on the head 122 of a wearer user 124, with the left temple 118 and right temple 120 resting over the user's ears 126 and 128, respectively, while a nose assembly 192 may rest over the user's nose 130—in the example of FIG. 1B, the HMD device may be supported on the head of the user in part or in whole by the nose display and/or the right and left over-ear temples, although straps (not shown) or other structures may be used in some embodiments to secure the HMD device to the head of the user. The housing 114 may be shaped and sized to position each of the two optical lens systems 110 and 112 in front of one of the user's eyes 132 and 134, respectively, such that a target location of each pupil 194 is centered vertically and horizontally in front of the respective optical lens systems and/or display panels. Although the housing 114 is shown in a simplified manner similar to eyeglasses for explanatory purposes, it should be appreciated that in practice more sophisticated structures (e.g., goggles, integrated headband, helmet, straps, etc.) may be used to support and position the display systems 102 and 104 on the head 122 of user 124.

The HMD device of FIG. 1B (and the HMD device of FIG. 1A) is capable of presenting a virtual reality display to the user, such as via corresponding video presented at a display rate such as 30 or 60 or 90 frames (or images) per second, while other embodiments of a similar system may present an augmented reality display to the user. Each of the displays 106 and 108 of FIG. 1B may generate light which is transmitted through and focused by the respective optical lens systems 110 and 112 onto the eyes 132 and 134, respectively, of the user 124. The pupil 194 aperture of each eye, through which light passes into the eye, will typically have a pupil size ranging from 2 mm (millimeters) in diameter in very bright conditions to as much as 8 mm in dark conditions, while the larger iris in which the pupil is contained may have a size of approximately 12 mm—the pupil (and enclosing iris) may further typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 124 as images and/or video. In some implementations, the distance between each of the optical lens systems 110 and 112 and the user's eyes 132 and 134 may be relatively short (e.g., less than 30 mm, less than 20 mm), which advantageously causes the HMD device to appear lighter to the user since the weight of the optical lens systems and the display systems are relatively close to the user's face, and also may provide the user with a greater field of view. While not illustrated here, some embodiments of such an HMD device may include various additional internal and/or external sensors.

In the illustrated embodiment, the HMD device 105 of FIG. 1B further includes hardware sensors and additional components, such as to include one or more accelerometers and/or gyroscopes 190 (e.g., as part of one or more IMU units)—as discussed in greater detail elsewhere herein, values from the accelerometer(s) and/or gyroscopes may be used to locally determine an orientation of the HMD device. In addition, the HMD device 105 may include one or more front-facing cameras, such as camera(s) 185 on the exterior of the front portion 116, and whose information may be used as part of operations of the HMD device, such as for providing AR functionality. Furthermore, the HMD device 105 may further include other components 175 (e.g., electronic circuits to control display of images on the display panels 106 and 108, internal storage, one or more batteries, position tracking devices to interact with external base stations, etc.), as discussed in greater detail elsewhere herein. Other embodiments may not include one or more of the components 175, 185 and/or 190. While not illustrated here, some embodiments of such an HMD may include various additional internal and/or external sensors, such as to track various other types of movements and position of the user's body, etc.

In the illustrated embodiment, the HMD device 105 of FIG. 1B further includes hardware sensors and additional components that may be used by disclosed embodiments as part of the described techniques for determining user pupil location and for verifying and/or correcting positioning of the HMD device. The hardware sensors in this example include one or more imaging sensors 172 (mounted on or near the display panels 106 and 108) and/or 195 (located on the interior surface 121 near the optical lens systems 110 and 112) for use in acquiring images of the actual locations of the user's pupils, such as separately for each pupil in this example. In other embodiments, one or more other sensors or components may be provided for otherwise tracking the user's pupil/gaze. As discussed in greater detail elsewhere herein, information from the components and sensors 172 and/or 195 may be used to determine a misalignment or other incorrect positioning of the HMD device (as discussed further in examples 2A-2D), and to initiate corresponding automated corrective actions. Furthermore, in at least some embodiments, the HMD device 105 may include one or more internal motors 138 (or other movement mechanisms) that may be used to move 139 the alignment and/or other positioning (e.g., in the vertical, horizontal left-and-right and/or horizontal front-and-back directions) of one or more of the optical lens systems 110 and 112 and/or display panels 106 and 108 within the housing of the HMD device 105, such as to personalize or otherwise adjust the target pupil location of one or both of the near-to-eye display systems 102 and 104 to correspond to the actual locations of one or both of the pupils 194. Such motors 138 may be controlled by, for example, user manipulation of one or more controls 137 on the housing 114 and/or via user manipulation of one or more associated separate I/O controllers (not shown)—in other embodiments the HMD device may control the alignment and/or other positioning of the optical lens systems 110 and 112 and/or display panels 106 and 108 without such motors 138, such as by use of adjustable positioning mechanisms (e.g., screws, sliders, ratchets, etc.) that are manually changed by the user via use of the controls 137. In addition, while the motors 138 are illustrated in FIG. 1B for only one of the optical lens systems, each optical lens systems may have its own one or more motors in some embodiments, and in some embodiments one or more motors may be used to control (e.g., independently) each of multiple optical lens systems.

While the described techniques may be used in some embodiments with a display system similar to that illustrated in FIGS. 1A and/or 1B, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

FIGS. 2A-2D illustrate examples of using imaging sensors to determine actual user pupil location, such as for use in aligning or otherwise positioning HMD devices or other display devices in particular manners in particular embodiments in accordance with the described techniques.

Figure 2A:
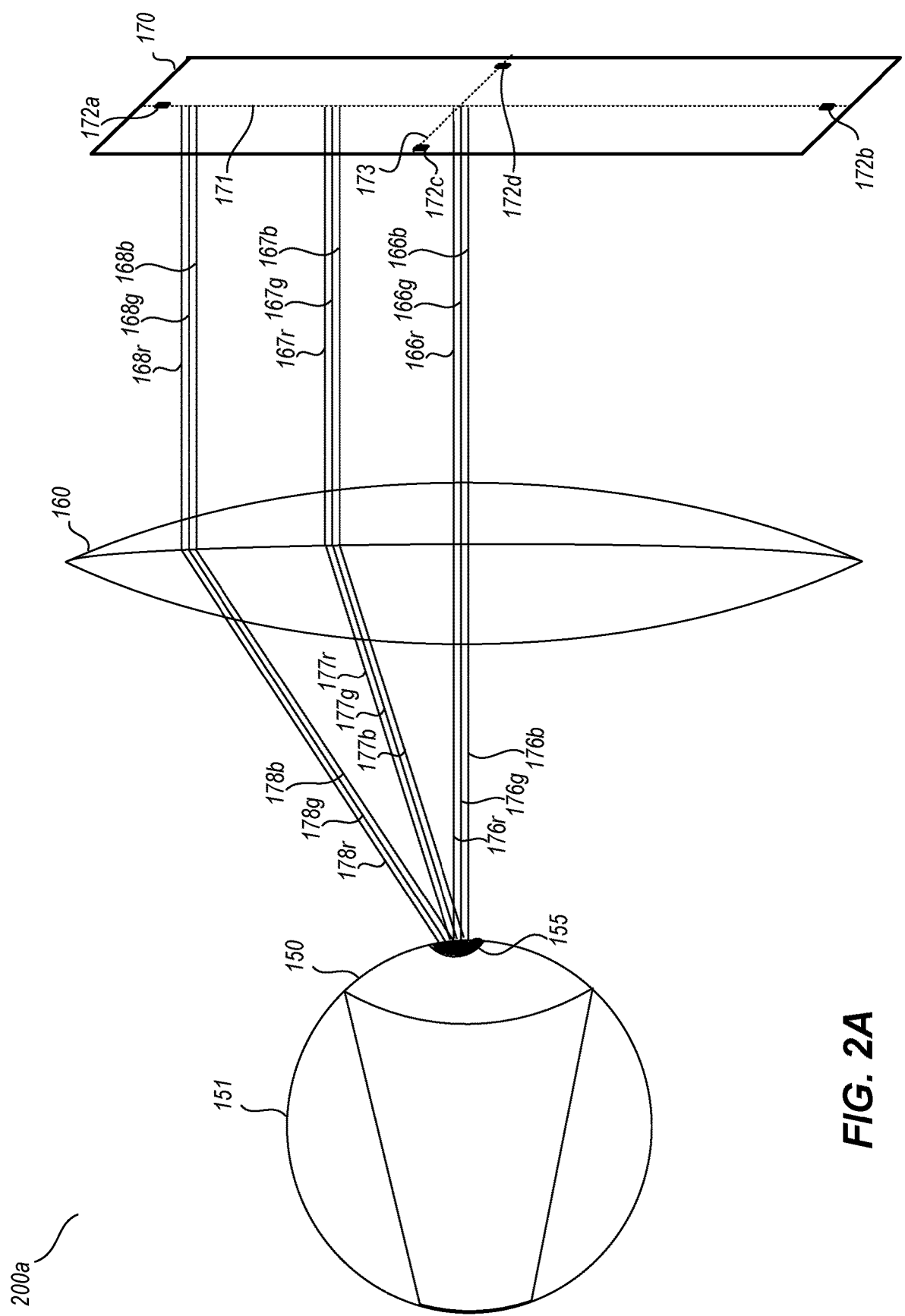
FIGS. 2A-2D illustrate examples of using imaging sensors to determine user pupil location, such as for use in aligning HMD devices in particular manners in particular embodiments in accordance with the described techniques.

In particular, FIG. 2A includes information 200a to illustrate operation of an example display panel 170 and associated optical lens 160 in providing image information to an eye 151 of a user, such as to focus the information on a pupil 155 of the eye. In the example of FIG. 2A, different color light rays 166-168 and 176-178 are illustrated separately (corresponding to pixels of different colors, such as use of red, green, and blue pixels in various combinations in an RGB display), such as to reflect an optical distortion phenomenon referred to as chromatic aberration that is caused in part by the different degrees of refraction of different color light rays when passing through a curved optical lens—however, such distortion may be corrected in whole or in part via the control of particular pixels on the display panel 170, and the remainder of the discussion herein treats the different color light rays in a similar manner to reflect such a correction being performed. Thus, in situations in which a set of pixels are located along the central vertical optical axis 171, the light emitted from them (such as in this example being shown as 166r, 166g and 166b for red, green and blue pixels, respectively) may pass through the optical lens along that central axis with little or no bending of the different light rays, as reflected in the resulting light rays 176r, 176g and 176b, respectively. Such light whose rays are parallel are referred to at times as collimated light. Conversely, the farther the light rays are located from the central optical axis when they pass through the optical lens 160, with a greater degree of curvature of the optical lens at those locations, the greater the amount of refraction. Thus, with respect to example light rays 167r, 167g and 167b emitted from respective red, green and blue pixels at an area approximately one third of the distance from the center of the display panel to the top of the display panel along the central vertical axis, the resulting light rays 177r, 177g and 177b are bent more than light rays 176 as they leave the optical lens 160 and approach the eye 151, so as to focus those rays on a corresponding portion of the pupil 155. Similarly, for light rays 168r, 168g and 168b that are emitted near the top of the display panel 230, the respective light rays 178r, 178g and 178b that are emitted from the optical lens 220 have even greater curvature, as illustrated. While not illustrated in the horizontal direction, a similar increasing curvature occurs along the horizontal axis for light rays that are increasingly distant from the vertical central axis. Accordingly, if the pupil 155 is located in the correct target location as shown, light from most or all of the display panel 170 will be focused on the pupil by the lens 160.

FIG. 2A further illustrates that one or more imaging sensors 172 may be mounted on one or more edges of the display panel 170, for use in acquiring images of the pupil 155 and some or all of the surrounding iris 150 from the locations of those imaging sensors. In this example, the imaging sensors 172 are placed at locations that include 172a near the top of the display panel along the central vertical axis, 172b near the bottom of the display panel along the central vertical axis, 172c near the left of the display panel (from the perspective of the eye) along the central horizontal axis 173, and 172d near the right of the display panel (from the perspective of the eye) along the central horizontal axis 173. It will be appreciated that if the pupil 155 is in the target location and an imaging sensor was present at the center of the display panel 170 (not shown), light passing from the iris 150 and pupil 155 to that center location (i.e., at the intersection of the axes 171 and 173) will follow a path similar to that illustrated for light rays 166 and 176 via the optical lens 160, with the pupil appearing substantially in the center of the resulting image in both the vertical and horizontal directions.

Figure 2B:
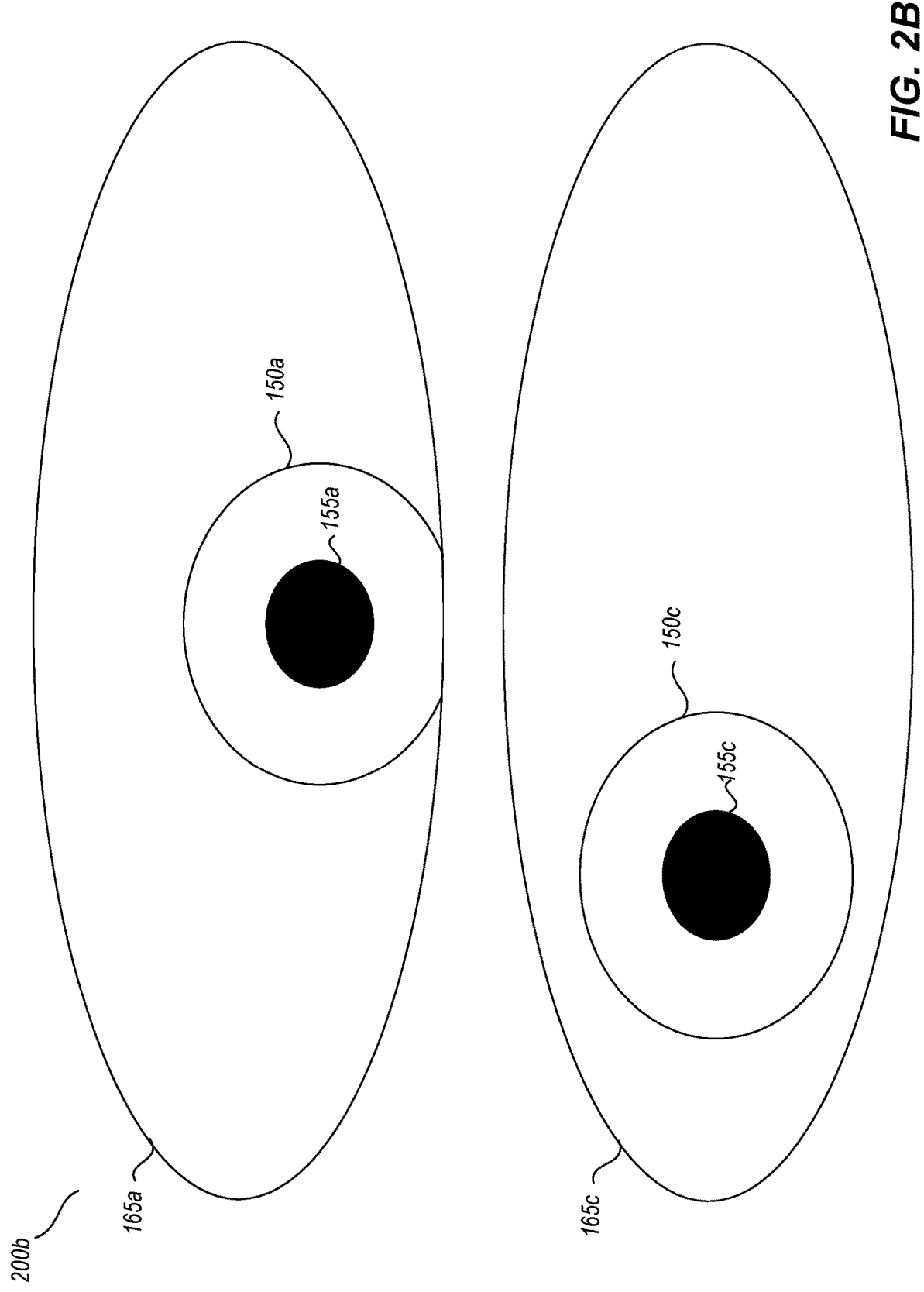

FIG. 2B illustrates example information 200b from which images may be acquired by example imaging sensors 172a and 172c of FIG. 2A. In particular, and in contrast to an example imaging sensor in the center of the display panel, the example imaging sensor 172a is near the location of the pixels producing light rays 168, and thus light passing from the iris 150 and pupil 155 to the imaging sensor 172a will follow a path via the optical lens 160 similar to that illustrated for light rays 168 and 178—thus, the pupil 155 in its target location will appear substantially in the center of the resulting image in the horizontal direction from the location of imaging sensor 172a, while appearing below the center vertically, as shown for iris 150a and pupil 155a in example information 165a of FIG. 2B. Thus, the pupil location 155a of example information 165a may correspond to the target location of the pupil from the location of imaging sensor 172a. Similarly, since the example imaging sensor is located along the horizontal central axis and near the left side of the display panel (from the perspective of the eye), the pupil 155 in its target location will appear substantially in the center of the resulting image in the vertical direction, while appearing to the left of the center horizontally, as shown for example iris 150c and pupil 155c in information 165c of FIG. 2B. Thus, the pupil location 155c of example information 165c may correspond to the target location of the pupil from the location of imaging sensor 172c. While the example information 165a and 165c illustrates a visible portion of an eye that includes substantial area outside of and surrounding the iris, it will be appreciated that the acquired images may be only a portion of the example information 165a and 165c, such as to include only some or all of the iris, and/or only some or all of the pupil.

It will also be appreciated that the imaging sensors 172 of FIG. 2A are shown for example purposes only, and that other embodiments may include only one imaging sensor or much larger numbers of imaging sensors, and that the imaging sensors may be located in other locations on the display panel and/or elsewhere. In addition, while not illustrated here, further hardware components may be used in some embodiments to assist in the acquisition of images from one or more of the imaging sensors. For example, the HMD device or other display device may include one or more illumination sources (e.g., infrared, visible light, etc.) to shine light on the iris and pupil to be reflected back to one or more imaging sensors, such as an illumination source mounted on or near the display panel 170, or instead elsewhere (e.g., between the optical lens 160 and the eye 151, such as on an interior surface, not shown, of an HMD device that includes the display panel 170 and optical lens 160). In some such embodiments, the light from such an illumination source may further be bounced off the display panel before passing through the optical lens 160 to illuminate the iris and pupil, such as to provide at least partially collimated light.

Figure 2C:
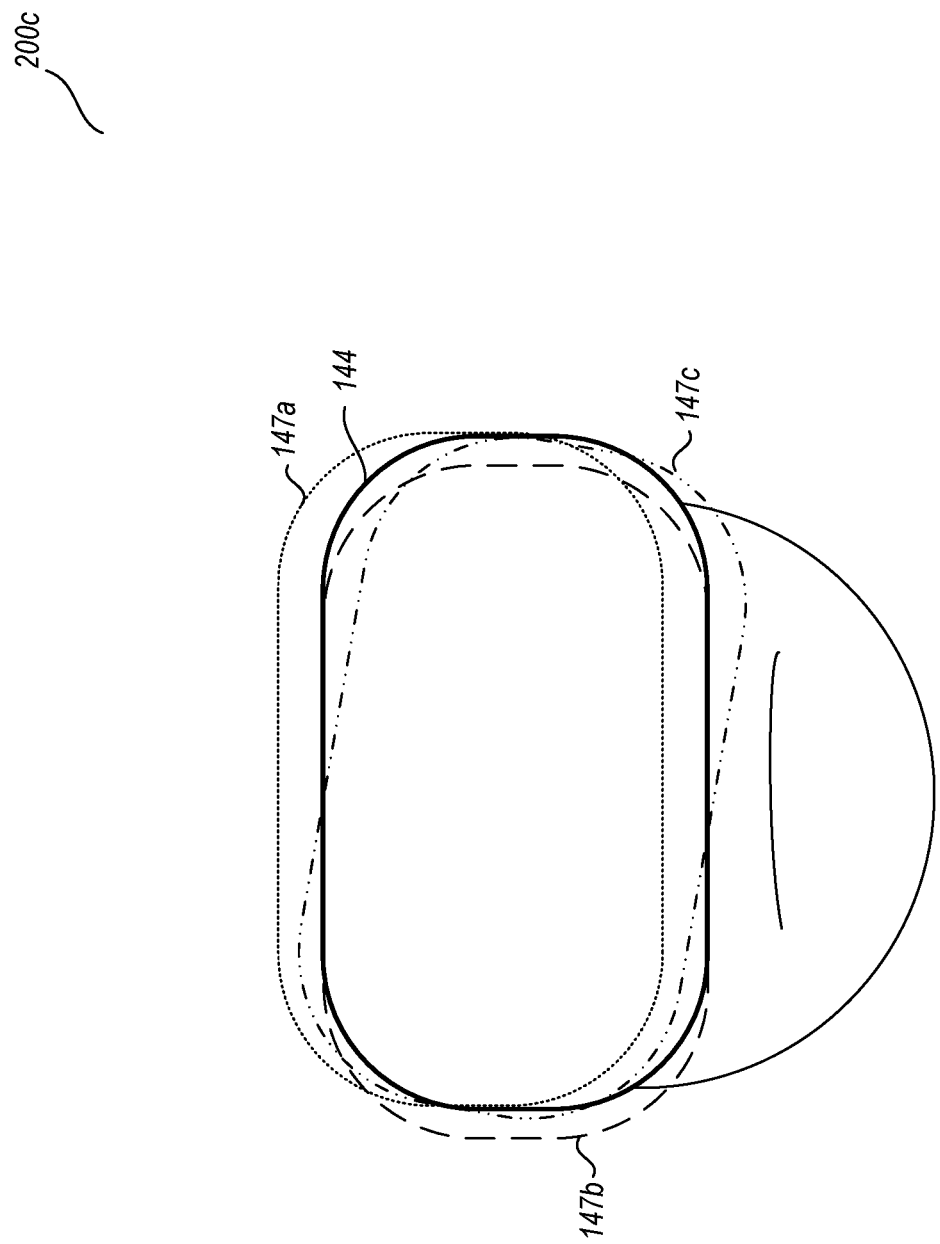

FIG. 2C continues the example of FIGS. 2A-2B, and includes information 200c illustrating examples of misaligned positioning of an HMD device, such as corresponding to the HMD device 144 illustrated in FIG. 1A. In particular, in FIG. 2C, a target aligned positioning 144 is illustrated, which is substantially level, and properly aligned in both horizontal and vertical directions relative to the head (partially shown) of the user to place both eyes of the user in their target locations. It will be appreciated that even if the HMD device is properly aligned in both horizontal and vertical directions relative to the head as with positioning 144, the alignment or other positioning of one or more optical lens systems and/or displays within the HMD device may need changes to alignment or other positioning within the HMD device to reflect a particular user, such as to personalize the alignment or other positioning to an interpupillary distance specific to the user.

Figure 2D:
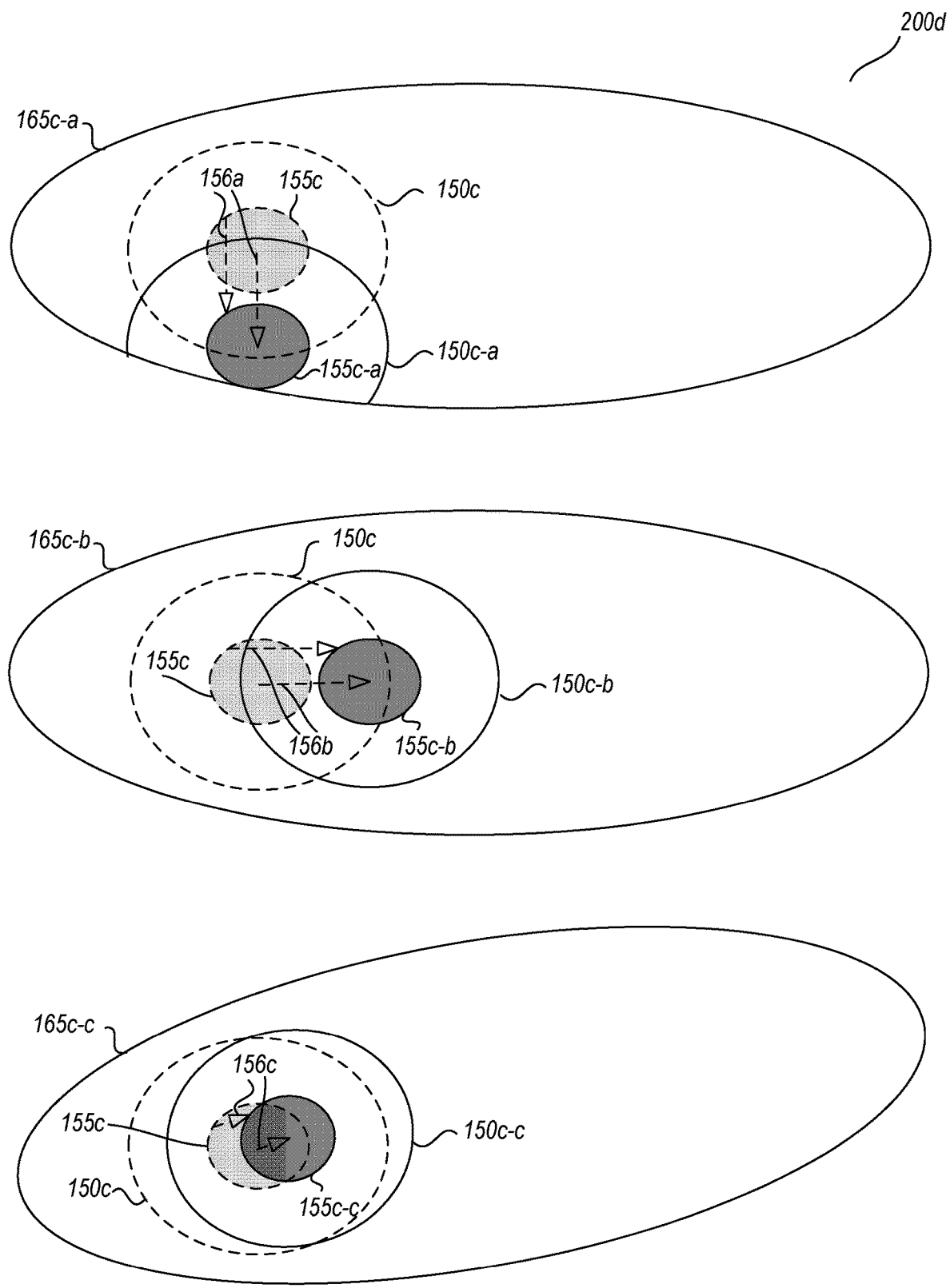

FIG. 2C further illustrates three examples 147a-147c of misaligned positioning, with further information in FIG. 2D corresponding to these examples—in at least some embodiments and situations, the described techniques may further be used to correct alignment or other positioning of the HMD device and/or of one or more components (e.g., optical lens systems) within the HMD device, such as if the degree or other amount of misalignment is sufficiently small to be within the adjustment range of the HMD device and/or its component(s). The misalignment examples of FIG. 2C include example misalignment 147a, in which the HMD positioning is moved too high on the head of the user and is thus vertically misaligned (e.g., to be positioned in part on the forehead of the user and to have the user's eyes be below their target locations). Example misalignment 147b conversely illustrates an alignment in which the HMD device is horizontally misaligned to one side, such that the user's eyes will similarly be horizontally offset with respect to their target positions. Example misalignment 147c illustrates a skewed misalignment, in which the one side of the HMD device is lower than the other side, such that the two eyes of the user will have different types of misalignment with respect to target location. It will be appreciated that in one or more of the displayed alignments, it is possible for one eye to be at or near its target location while the other eye is not at or near its target location, or instead that both or neither eyes are correctly positioned. It will be further appreciated that other types of misalignment than those illustrated may occur, and that some misalignment situations may include combinations of two or more of the example types of misalignment shown with respect to FIG. 2C.

FIG. 2D continues the examples of FIGS. 2A-2C, and includes information 200d that shows three examples of pupil location information that may differ from target pupil locations, such as due to misalignments of the type illustrated in FIG. 2C and/or for other reasons. In the example of FIG. 2D, each of the pupil locations are shown from the perspective of imaging sensor 172c of FIG. 2A, such that example information 165c of FIG. 2B may illustrate target location information for contrast with the actual pupil location in these example misalignment scenarios.

In particular, example information 165c-a of FIG. 2D includes indicated locations 150c and 155c of an iris and a pupil that correspond to target pupil location from information 165c of FIG. 2B, and further illustrates different positions 150c-a and 155c-a corresponding to a change in iris and pupil location (e.g., corresponding to misalignment 147a of FIG. 2C). In this example, the actual pupil location 155c-a is vertically below the target location 155c (e.g., due to the HMD device being vertically raised above the target positioning). The information 156a illustrates one or more differences that may be measured between the target pupil location 155c and the actual pupil location 155c-a (e.g., to identify and compare the centroids of the black portion corresponding to the pupils and/or to similarly measure one or more other points or locations between the two pupil locations), such as for use in determining whether the difference(s) exceed a defined threshold or otherwise satisfy criteria to use that initiate corresponding automated corrective actions. In a similar manner, example information 165c-b illustrates that the actual pupil and iris locations 155c-b and 150c-b differ horizontally from the target locations 150c and 155c (e.g., due to the HMD device being horizontally moved, such as is illustrated in the misalignment example 147b of FIG. 2C), with information 156b illustrating one or more differences that may be measured between the target pupil location 155c and the actual pupil location 155c-b. Similarly, example information 165c-c illustrates that the actual pupil location 155c-c may differ both vertically and horizontally from the target pupil location 155c (e.g., due to the HMD device being skewed, such as is illustrated in the misalignment example 147c of FIG. 2C), with information 156c illustrating one or more differences that may be measured between the target pupil location 155c and the actual pupil location 155c-c.

It will be appreciated that the details of the examples of FIGS. 2A-2D are provided for illustrative purposes only, and that the invention is not limited to such details.

Figure 3:
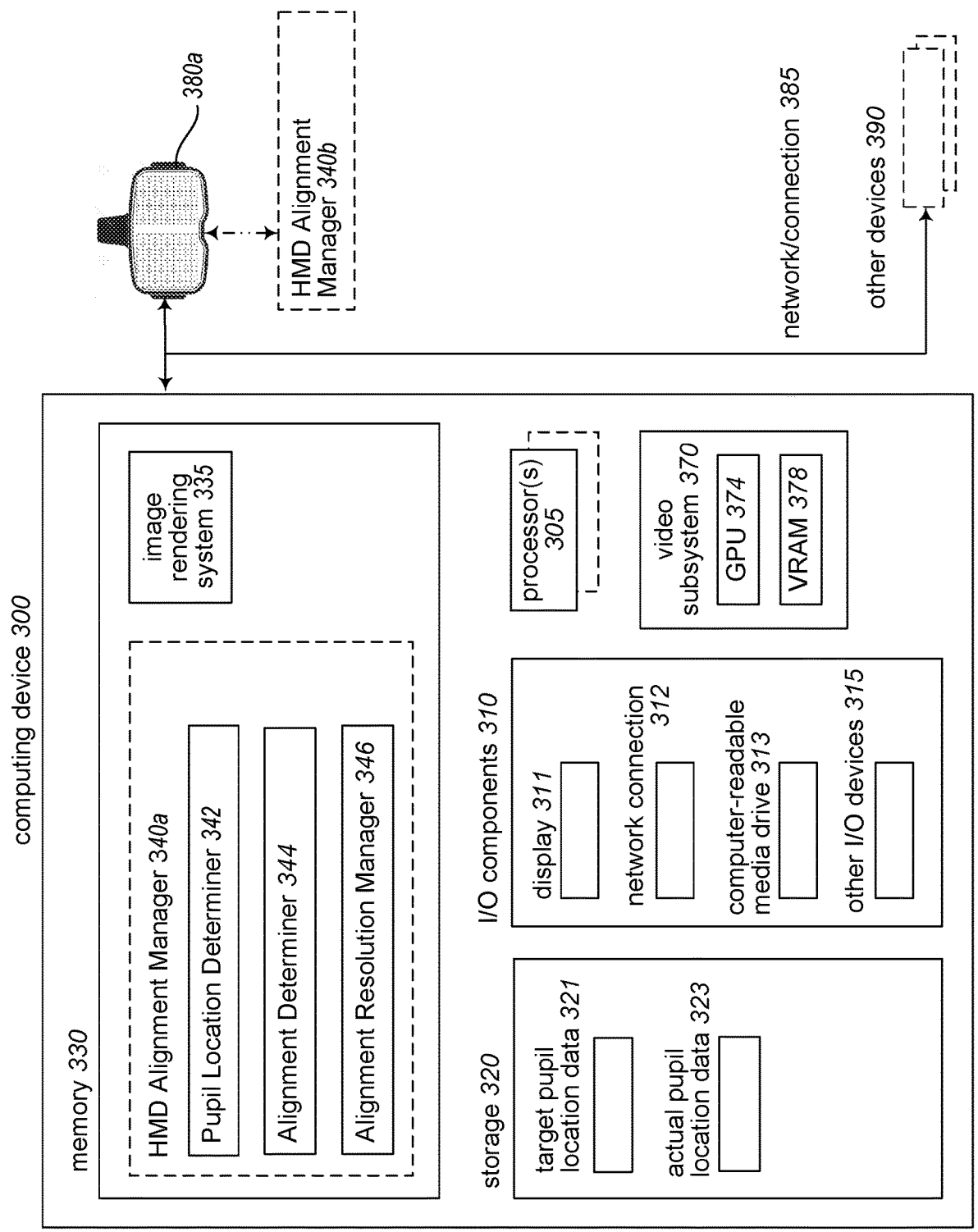
FIG. 3 is a block diagram illustrating example devices and systems for performing at least some of the described techniques, including an embodiment of an HMD Alignment Manager system.

FIG. 3 is a block diagram illustrating example computing devices and systems for performing at least some of the described techniques. In particular, FIG. 3 includes one or more computing devices 300 that are suitable for generating and providing images to an associated HMD device 380a (such as HMD devices 144 and/or 105 of FIGS. 1A and 1B, respectively) and/or other display device (not shown). In some embodiments, the computing device(s) 300 may perform at least some of the described techniques for determining user pupil location and for verifying and/or correcting positioning of optical lens system(s) of a display device, such as by executing an embodiment of an HMD Alignment Manager system 340a in memory 330 and using one or more hardware processors 305 and/or 374. In some embodiments, some or all of the HMD Alignment Manager system 340b is executed on the HMD device 380a using electronic circuitry on it (not shown) to perform at least some of the described techniques, such as instead of or in addition to operations of the HMD Alignment Manager system 340a on computing device(s) 300. One or more optional other computing systems 390 are also illustrated (e.g., to provide images or other information for use by the image rendering system 335 and/or display devices 380, to assist in performing position tracking of the display device 380a, etc.), with the various devices interconnected via one or more computer networks or other connections 385 (e.g., the Internet, one or more cellular telephone networks, a tether or other cable, a local wireless connection, etc.), including to enable communications between the computing systems, devices, and any other systems or components implemented on them.

The example computing device(s) 300 each includes one or more hardware processors 305 (e.g., one or more CPU, or central processing unit, processors, etc.), various input/output ("I/O") components 310, storage 320, and memory 330, as well as having a video subsystem 370 to manage display operations on the HMD device 380a. The video subsystem 370 includes one or more GPUs (or graphic processing units) and associated VRAM (video RAM), such as to provide a high volume of video frame data (corresponding to high image resolution for each video frame, as well as a high "frame rate" of approximately 60-180 of such video frames per second) to implement a quality gaming or other image viewing experience, although in other embodiments a separate video subsystem may not be provided or used. Illustrated I/O components in this example embodiment include a display 311, a network connection 312, a computer-readable media drive 313, and other I/O devices 315 (e.g., keyboards, mice or other pointing devices, microphones, speakers, tactile output, handheld wireless or other controllers, an IR transmitter and/or receiver, other photo sensors, GPS receiver or other location-determination devices, pupil and/or gaze tracking components, etc.)—such I/O components may enable a variety of types of interactions, including, for example, voice control, gesture control, etc. While various of the details illustrated with respect to the computing devices 300 are not illustrated with respect to the devices 380a and 390, the devices 380a and 390 may similarly include some or all of the same types of components as the computing devices 300, including for the display device 380a to optionally include one or more processors or other electronic circuitry configured to execute an embodiment of the system 340b. The device 380a may further include additional components that are not illustrated with respect to device(s) 300, such as one or more optical lens systems, display panels, a housing, imaging sensors and other sensors (e.g., an IMU), other I/O devices (e.g., one or more internal and/or external cameras, one or more speakers to provide sound to the ears of the wearer or other user, one or more other pupil and/or gaze tracking systems, other types of movement sensors or other sensors, etc.), etc. Similarly, if one or more of the other computing systems 390 operate in conjunction with the device 380a, such as to provide motion tracking and/or image display capabilities, those other computing systems may similarly include additional components that are not illustrated with respect to device(s) 300.

In this example, at least some of an HMD Alignment Manager system 340a is executing in memory 330 of the computing device 300, along with an associated image rendering system 335 and optionally one or more other programs (not shown). As discussed in greater detail elsewhere herein, the HMD Alignment Manager system 340a may perform at least some of the described techniques for determining user pupil location and for verifying and/or correcting positioning of optical lens system(s) of a display device. In this example, the system 340a includes a Pupil Location Determiner component 342 to acquire and/or analyze images of actual pupil locations of one or more users of device 380a, an Alignment Determiner component 344 to determine whether errors exist in the alignment or other positioning of device 380a (e.g., based on comparison to target location information), and an Alignment Resolution Manager component 346 to take automated corrective actions if errors are determined to exist in the alignment or other positioning. It will be appreciated that other embodiments of the system 340a may be structured differently, such as to lack one or more such components and/or to include other components, and that system 340b may similarly include some or all such illustrated components. As part of its operation, the system 340 (whether 340a and/or 340b) may generate and/or use various stored data, such as on storage 320, including data 321 related to target pupil locations (e.g., for one or more imaging sensors, not shown, on device 380a) and data 323 about actual pupil location that is determined (e.g., acquired images and/or resulting information from their analysis). The image rendering system 335 may further store and use additional data on computing device 300 or elsewhere (e.g., on one of the other devices 390), such as for use in performing one or more games in embodiments in which the image rendering system is part of a game system, but those details are not illustrated in this example. While the HMD Alignment Manager system 340a is implemented at least in part as a software system in this example, such as with corresponding software instructions that when executed program or otherwise configure the processor(s) 305 and/or 374 and the computing device(s) 300 to perform automated operations that implement at least some of the described techniques, it may be implemented in other manners in other embodiments, including in part or in whole on corresponding configured electronic circuitry of the device 380a.

It will be appreciated that, while the display device 380a is depicted as being distinct and separate from the computing device 300 in the illustrated embodiment of FIG. 3, in certain embodiments some or all components of the illustrated device 380a and the device 300 may be integrated and/or housed within a single device, such as a mobile gaming device, portable VR entertainment system, etc. In such embodiments, networks/connections 385 may include, for example, one or more system bus and/or video bus architectures.

It will also be appreciated that the illustrated devices are merely illustrative and are not intended to limit the scope of the present invention. For example, computing device(s) 300 and/or other device(s) 380a and 390 may be connected to other devices that are not illustrated, including through one or more networks such as the Internet or via the Web. More generally, a computing system or device may comprise any combination of hardware that can interact and perform the described types of functionality, such as when programmed or otherwise configured with appropriate software, including without limitation desktop computers, laptop computers, slate computers, tablet computers or other computers, a gaming console or other dedicated gaming systems, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate inter-communication capabilities. For example, the illustrated system 340 may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity.

Thus, in at least some embodiments, the illustrated system is a software-based system including software instructions that, when executed by the processor(s) 305 and/or 374 and/or other processor means (e.g., on device 380a), program the processor(s) to automatically perform the described operations for that system. Furthermore, in some embodiments, some or all of the systems may be implemented or provided in other manners, such as at least partially in firmware and/or hardware means, including, but not limited to, one or more hardware processors or other configured hardware circuitry such as one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), digital signal processors (DSPs), programmable logic controllers (PLCs), etc. Some or all of the systems or data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 4 is a flow diagram of an example embodiment of an HMD Alignment Manager routine 400. The routine may be performed by, for example, the HMD Alignment Manager system 340a and/or 340b of FIG. 3 and/or a system performing the described techniques discussed with respect to FIGS. 2A-2D and elsewhere herein, such as to determine actual user pupil location and to verify and/or correct corresponding positioning of optical lens system(s) of a display device. While the illustrated example of the routine is performed for a single HMD device at a single time and optionally for both pupils of a user of the HMD device, it will be appreciated that such a routine may be used in other manners, including for other types of display devices, to simultaneously perform determinations for multiple display devices, to analyze information for only a single pupil and/or imaging sensor, etc. In addition, it will be appreciated that the illustrated embodiment of the routine may be implemented in software and/or hardware as appropriate, and may be performed by, for example, an HMD device or other display device (e.g., HMD devices 144 and/or 105 of FIGS. 1A and 1B, respectively), or instead a system separate from an HMD device or other display device (e.g., that provides images to the display device). Furthermore, while the illustrated embodiment of the routine detects and corrects alignment issues of a user's eyes with respect to the optical lens systems of the HMD device, it will be appreciated that other types of positioning may be detected and corrected, as discussed elsewhere herein.

The illustrated routine begins at block 405, where information is retrieved about one or more target pupil locations for an HMD device, such as for an HMD device on which the routine is executed, and optionally for each of one or more imaging sensor locations. As noted above, the routine may be initiated at various times in various embodiments, such as at the startup of the HMD device, or at other times. After block 405, the routine continues to block 410 to acquire one or more images of one or more pupils of a user of the HMD device by using one or more imaging sensors on the HMD device. In block 415, the routine then analyzes the acquired images to determine the locations of the pupils of the user in the images, such as by finding a center location of black pixels in the image that correspond to the pupil. In block 420, the routine then compares the determined pupil locations to target pupil locations retrieved in block 405.

In block 425, the routine then determines if the determined information from the comparison indicates that the differences exceed one or more thresholds or other criteria to initiate automated corrective operations, and if so, proceeds to block 435. In the illustrated embodiment, the routine then in block 435 performs one or more automated operations to correct the positioning of the HMD optical lens systems for one or both pupils by reducing or eliminating the differences determined with respect to block 420, such as by automatically adjusting the positioning of the HMD device or one or more internal components of it (e.g., via automated manipulation of one or more motors of the HMD device), and/or providing information to the user to correct alignment, including optionally indicating one or more manners in which the correction is to be performed (e.g., to move the HMD device up, down, right, left, etc.) via one or more controls on the HMD device and/or accessible via one or more separate I/O controllers or other devices. After block 425, the routine continues to block 485 where it optionally delays further operations until the alignment is corrected, although in other embodiments the operations may continue regardless of whether or not the differences are reduced or eliminated (e.g., optionally with a subsequent check of the alignment as the routine returns to block 405 from block 495).

After block 485, or if it instead determined in block 425 that the determined differences do not exceed the thresholds or other criteria, the routine continues to block 495 to determine whether to continue, such as until an explicit indication to terminate is received (or if the routine is performed only once until it is later initiated again). If it is determined to continue, the routine returns to block 405, and otherwise continues to block 499 and ends. In some embodiments, the alignment determination and correction operations of the routine are performed in a continuous or near-continuous manner, such that the routine continues to loop from 495 to 405 while use of the HMD device is ongoing.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

In addition, the sizes and relative positions of elements in the drawings are not necessarily drawn to scale, including the shapes of various elements and angles, with some elements enlarged and positioned to improve drawing legibility, and the particular shapes of at least some elements being selected for ease of recognition without conveying information regarding the actual shape or scale of those elements. In addition, some elements may be omitted for clarity and emphasis. Furthermore, repeated reference numbers in different drawings may signify the same or similar elements.

From the foregoing it will be appreciated that, although specific embodiments have been described herein for purposes of illustration, various modifications may be made without deviating from the spirit and scope of the invention. In addition, while certain aspects of the invention are presented at times in certain claim forms, or may not be embodied in any claims at some times, the inventors contemplate the various aspects of the invention in any available claim form. For example, while only some aspects of the invention may be recited at a particular time as being embodied in a computer-readable medium, other aspects may likewise be so embodied.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Provisional App. No. 62/710,374 filed Feb. 16, 2018, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of aligning components of a head-mounted display (HMD) device, the method comprising:
    causing the HMD device to perform operations in an environment;
    measuring, by one or more light sensors positioned external to the HMD device that detect and use light information emitted from one or more base stations, an amount or degree of movement by the HMD device as the HMD device is operated in the environment;
    comparing the measured amount or degree of movement measured by the one or more sensors external to the HMD device to a defined threshold; and
    responsive to determining that the amount or degree of movement exceeds the defined threshold, aligning components of the HMD device by:
        obtaining, from each of two or more imaging sensors on an HMD device, one or more images of one or more eyes of a user wearing the HMD device on a head of the user;
        analyzing the images obtained from each of the two or more image sensors to determine information about an actual pupil location of at least one pupil of the user, wherein analyzing the images comprises combining analysis results for each of the images obtained from of the two or more imaging sensors to determine information about the actual pupil location;
        determining, based at least in part on a comparison of the determined information about the actual pupil location to additional information about a target pupil location for the at least one pupil, that the HMD device is misaligned on the head of the user; and
        performing, based at least in part on the determining, one or more automated corrective actions to correct alignment of at least one component of the HMD device for the user.

2. The method of claim 1 wherein analyzing the images comprises finding a center location of pixels that are sufficiently dark in the images that correspond to the at least one pupil of the user.

3. The method of claim 1 wherein obtaining, from each of the two or more imaging sensors on an HMD device, one or more images comprises obtaining one or more images from one or more optical flow sensor integrated circuits on the HMD device.

4. The method of claim 1 wherein obtaining, from each of the two or more imaging sensors on an HMD device, one or more images comprises obtaining one or more images from one or more optical flow sensor integrated circuits mounted on or near at least one display panel of the HMD device.

5. The method of claim 1 wherein determining that the HMD device is misaligned on the head of the user comprises determining an amount of vertical or horizontal difference between the target pupil location and the actual pupil location.

6. The method of claim 1 wherein analyzing the images obtained from each of the two or more imaging sensors comprises analyzing the images obtained from each of the two or more imaging sensors to determine information about the actual pupil location in three dimensions.

7. The method of claim 1 wherein performing one or more corrective actions comprises automatically controlling one or more mechanical actuators that control at least one of: a configuration of one or more straps attached to a housing of the HMD device, a configuration of a nose piece structure that rests on a nose of the user, a location of one or more optical lens systems of the HMD device, or a location of one or more display panels of the HMD device.

8. The method of claim 1 wherein performing one or more automated corrective actions comprises providing information to the user to cause the user to take one or more corrective actions to correct alignment of at least one component of the HMD device for the user.

9. The method of claim 8 wherein providing information to the user comprises providing information that includes at least one of: a notice of an alignment or other positioning problem, or instructions for correcting an alignment or other positioning problem.

10. The method of claim 8 wherein providing information to the user comprises instructing the user to control one or more mechanical actuators of the HMD device via manual manipulation of one or more controls operatively coupled to the one or more mechanical actuators.

11. The method of claim 1, further comprising performing the method of aligning components of the HMD device responsive to specified criteria.

12. The method of claim 1, further comprising determining the additional information about the target pupil location based on at least one of: the structural configuration of the HMD device, testing of the HMD device during a manufacturing process, or testing of the HMD device by the user during initial use.

13. A method of aligning components of a head-mounted display (HMD) device, the method comprising:
causing the HMD device to perform operations;
measuring, by one or more light sensors positioned external to the HMD device that detect and use light information emitted from one or more base stations, an amount or degree of movement by the HMD device as the HMD device is operated in the environment;
comparing the measured amount or degree of movement measured by the one or more sensors external to the HMD device to a defined threshold; and
responsive to determining that the amount or degree of movement exceeds the defined threshold, aligning components of the HMD device by:
obtaining, from each of two or more imaging sensors on an HMD device, one or more images of one or more eyes of a user wearing the HMD device on a head of the user;
analyzing the images obtained from each of the two or more image sensors to determine information about an actual pupil location of at least one pupil of the user, wherein analyzing the images comprises combining analysis results for each of the images obtained from of the two or more imaging sensors to determine information about the actual pupil location;
determining, based at least in part on a comparison of the determined information about the actual pupil location to additional information about a target pupil location for the at least one pupil, that the HMD device is misaligned on the head of the user;
responsive to determining that the HMD device is misaligned on the head of the user, pausing or stopping some or all of the operations of the HMD device; and
responsive to determining that the misalignment of the HMD device is corrected, resuming the paused or stopped operations of the HMD device.

14. A head-mounted display (HMD) device, comprising:
a support structure wearable on the head of a user;
two or more imaging sensors coupled to the support structure;
at least one nontransitory processor-readable storage medium that stores at least one of processor-executable instructions or data; and
at least one processor operatively coupled to the one or more imaging sensors and the at least one nontransitory processor-readable storage medium, in operation, the at least one processor:
causes the HMD device to perform operations;
measures, by one or more light sensors positioned external to the HMD device that detect and use light information emitted from one or more base stations, an amount or degree of movement by the HMD device as the HMD device is operated in the environment;
compares the measured amount or degree of movement measured by the one or more sensors external to the HMD device to a defined threshold; and
responsive to at determination that the amount or degree of movement exceeds the defined threshold, aligns components of the HMD device, wherein to align the components of the HMD device, the at least one processor:
obtains, from each of the two or more imaging sensors, one or more images of one or more eyes of the user wearing the HMD device on a head of the user;
analyzes the images obtained from each of the two or more image sensors to determine information about an actual pupil location of at least one pupil of the user, wherein analyzing the images comprises combining analysis results for each of the images obtained from of the two or more imaging sensors to determine information about the actual pupil location;
determines, based at least in part on a comparison of the determined information about the actual pupil location to additional information about a target pupil location for the at least one pupil, that the HMD device is misaligned on the head of the user; and performs, based at least in part on the determination that the HMD device is misaligned, one or more automated corrective actions to correct alignment of at least one component of the HMD device for the user.

15. The HMD device of claim 14 wherein the two or more image sensors comprise one or more optical flow sensor integrated circuits, one or more cameras, or one or more wafer-level optics.

16. The HMD device of claim 14 wherein the two or more image sensors are mounted on or near at least one display panel of the HMD device.

17. The HMD device of claim 14 wherein, to determine that the HMD device is misaligned on the head of the user, the at least one processor determines an amount of vertical or horizontal difference between the target pupil location and the actual pupil location.

18. The HMD device of claim 14 wherein the HMD device further comprises one or more mechanical actuators, and to perform one or more automated corrective actions, the at least one processor automatically controls the one or more mechanical actuators to correct alignment of the at least one component of the HMD device for the user.

19. The HMD device of claim 18 wherein the one or more mechanical actuators comprise one or more motors.

20. The HMD device of claim 18 wherein the one or more mechanical actuators control at least one of: a location of one or more optical lens systems of the HMD device, a location of one or more display panels of the HMD device, a configuration of one or more straps attached to a housing of the HMD device, or a configuration of nose piece structure that rests on a nose of the user.

21. A head-mounted display (HMD) device, comprising:
a support structure wearable on the head of a user;
first and second display panels coupled to the support structure;
two or more optical flow sensor integrated circuits coupled to the support structure;
one or more mechanical actuators;
at least one nontransitory processor-readable storage medium that stores at least one of processor-executable instructions or data; and
at least one processor operatively coupled to the one or more optical flow sensor integrated circuits and the at least one nontransitory processor-readable storage medium, in operation, the at least one processor:

causes the HMD device to perform operations;

measures, by one or more light sensors positioned external to the HMD device that detect and use light information emitted from one or more base stations, an amount or degree of movement by the HMD device as the HMD device is operated in the environment;

compares the measured amount or degree of movement measured by the one or more sensors external to the HMD device to a defined threshold; and responsive to at determination that the amount or degree of movement exceeds the defined threshold, aligns components of the HMD device, wherein to align the components of the HMD device, the at least one processor:

obtains, from each of the two or more optical flow sensor integrated circuits, one or more images of one or more eyes of the user wearing the HMD device on a head of the user;

analyzes the more images obtained from each of the two or more optical flow sensor integrated circuits to determine information about an actual pupil location of at least one pupil of the user, wherein analyzing the images comprises combining analysis results for each of the images obtained from of the two or more optical flow sensor integrated circuits to determine information about the actual pupil location;

determines, based at least in part on a comparison of the determined information about the actual pupil location to additional information about a target pupil location for the at least one pupil, that the HMD device is misaligned on the head of the user; and responsive to a determination that the HMD device is misaligned, corrects alignment of at least one component of the HMD device for the user by automatically controlling the one or more mechanical actuators to control at least one of: a configuration of one or more straps attached to a housing of the HMD device, or a configuration of nose piece structure that rests on a nose of the user.

* * * * *